(12) United States Patent
Sydorchuk et al.

(10) Patent No.: US 12,462,787 B1
(45) Date of Patent: Nov. 4, 2025

(54) TEXT-TO-SPEECH SYNTHESIS USING GENERATIVE ARTIFICIAL INTELLIGENCE MODELS

(71) Applicant: Pheon, Inc., San Francisco, CA (US)

(72) Inventors: Kyrylo Sydorchuk, Kharkov (UA); Ivan Shuhaienko, Kharkov (UA); Elizaveta Perchenko, Vancouver (CA); Yurii Astafiev, Kharkov (UA)

(73) Assignee: Pheon, Inc., San Francisco, CA (US)

( * ) Notice: Subject to any disclaimer, the term of this patent is extended or adjusted under 35 U.S.C. 154(b) by 0 days.

(21) Appl. No.: 19/209,971

(22) Filed: May 16, 2025

(51) Int. Cl.
*G10L 25/30* (2013.01)
*G10L 13/047* (2013.01)
*G10L 25/63* (2013.01)

(52) U.S. Cl.
CPC ............ *G10L 13/047* (2013.01); *G10L 25/30* (2013.01); *G10L 25/63* (2013.01)

(58) Field of Classification Search
CPC ..................................................... G10L 13/047
USPC ......................................................... 704/258
See application file for complete search history.

(56) References Cited

U.S. PATENT DOCUMENTS

| | | | | |
|---|---|---|---|---|
| 11,354,463 | B1 * | 6/2022 | Babaali | G06F 8/35 |
| 11,404,087 | B1 * | 8/2022 | Khalilia | G06V 40/171 |
| 12,231,380 | B1 * | 2/2025 | Rodgers | G06F 40/30 |
| 12,346,367 | B2 * | 7/2025 | O'Neill | G06F 16/483 |
| 2021/0239863 | A1 * | 8/2021 | Tavitian | G06T 11/008 |
| 2022/0020155 | A1 * | 1/2022 | Ye | G06T 7/10 |
| 2022/0229999 | A1 * | 7/2022 | Vig | H04L 51/02 |
| 2024/0155205 | A1 * | 5/2024 | Shah | H04N 21/4884 |
| 2024/0256592 | A1 * | 8/2024 | O'Neill | G06F 16/483 |
| 2025/0061634 | A1 * | 2/2025 | Huang | G06T 13/40 |
| 2025/0131918 | A1 * | 4/2025 | Braganza | G10L 15/16 |
| 2025/0131930 | A1 * | 4/2025 | Sulewski | G10L 19/022 |

OTHER PUBLICATIONS

Promptts++: Controlling Speaker Identity in Prompt-Based Text-To-Speech Using Natural Language Descriptions Reo Shimizu et al, (Year: 2024).*
M. Okamoto, S. Sakti and S. Nakamura, "Towards Speech Entrainment: Considering ASR Information in Speaking Rate Variation of TTS Waveform Generation," 2020 23rd Conference of the Oriental COCOSDA International Committee for the Co-ordination and Standardisation of Speech Databases and Assessment Tech (Year: 2020).*
Black Forest Labs. FLUX. 2024. https://github.com/black-forest-labs/flux.

(Continued)

*Primary Examiner* — Bharatkumar S Shah
(74) *Attorney, Agent, or Firm* — Georgiy L. Khayet

(57) ABSTRACT

A method and a system for generating human speech audio in a conversation using a trained generative AI model are provided. The method includes receiving a text input representing a portion of the conversation, receiving dialog context associated with the conversation, receiving information representing at least one voice and speaking style of at least one speaker in the conversation, generating the at least one voice and speaking style based on the received information, and generating at least one emotional audio response for the at least one speaker using the at least one voice and speaking style and without retraining the trained generative AI model.

16 Claims, 9 Drawing Sheets

(56) References Cited

OTHER PUBLICATIONS

Chen, Y., Niu, Z., Ma, Z., Deng, K., Wang, C., Zhao, J., Yu, K., and Chen, X. F5-TTS: A Fairytaler that Fakes Fluent and Faithful Speech with Flow Matching. 2024. arXiv preprint arXiv:2410.06885.https://arxiv.org/ abs/2410.06885.

Défossez, A., Copet, J., Synnaeve, G., and Adi, Y. High fidelity neural audio compression. 2022. arXiv preprint arXiv:2210.13438. https://arxiv.org/abs/2210.13438.

Devlin, J., Chang, M. W., Lee, K., and Toutanova, K. Bert: Pre-training of deep bidirectional transformers for language understanding. In Proceedings of the 2019 conference of the North American chapter of the association for computational linguistics: human language technologies, vol. 1. Jun. 2019. pp. 4171-4186. https://arxiv.org/ abs/1810.04805.

Du, Z., Wang, Y., Chen, Q., Shi, X., Lv, X., Zhao, et al. CosyVoice 2: Scalable Streaming Speech Synthesis with Large Language Models. 2024. arXiv preprint arXiv:2412.10117. https://arxiv.org/abs/2412.10117.

Du, Z., Wang, Y., Chen, Q., Shi, X., Lv, X., Zhao, T., et al. CosyVoice: A Scalable Multilingual Zero-shot Text-to-speech Synthesizer based on Supervised Semantic Tokens. 2024. https://arxiv.org/abs/2407.05407.

Eskimez, S. E., Wang, X., Thakker, M., Li, C., Tsai, C. H., Xiao, Z., et al. E2 TTS: Embarrassingly easy fully non-autoregressive zero-shot TTS. Dec. 2024. In 2024 IEEE Spoken Language Technology Workshop (SLT) (pp. 682-689). IEEE. https://arxiv.org/abs/2406.18009.

Frans, K., Hafner, D., Levine, S., and Abbeel, P. One step diffusion via shortcut models. 2024. arXiv preprint arXiv:2410.12557. https://arxiv.org/abs/2410.12557.

Ho, J., & Salimans, T. Classifier-free diffusion guidance. 2022. arXiv preprint arXiv:2207.12598. https://arxiv.org/abs/2207.12598.

J. Darefsky, G. Zhu, and Z. Duan, "Parakeet," May 12, 2024. https://jordandarefsky.com/blog/2024/parakeet/.

Kanda, N., Wang, X., Eskimez, S. E., Thakker, M., Yang, H., Zhu, Z., et al. Making flow-matching-based zero-shot text-to-speech laugh as you like. 2024. arXiv preprint arXiv:2402.07383. https://arxiv.org/abs/2402.07383.

Liu, X., Gong, C., and Liu, Q. Flow straight and fast: Learning to generate and transfer data with rectified flow. 2022. arXiv preprint arXiv:2209.03003. https://arxiv.org/abs/2209.03003v1.

Peebles W., Xie S. Scalable diffusion models with transformers. Proceedings of the IEEE/CVF International Conference on Computer Vision. 2023. pp. 4195-4205. https://arxiv.org/abs/2212.09748.

Siuzdak, H. Vocos: Closing the gap between time-domain and fourier-based neural vocoders for high-quality audio synthesis. 2023. arXiv preprint arXiv:2306.00814. https://arxiv.org/abs/2306.00814.

Woo, S., Debnath, S., Hu, R., Chen, X., Liu, Z., Kweon, I. S., & Xie, S. Convnext v2: Co-designing and scaling ConvNets with masked autoencoders. Proceedings of the IEEE/CVF conference on computer vision and pattern recognition. 2023. pp. 16133-16142. https://arxiv.org/abs/2301.00808.

Xingchao Liu, Chengyue Gong, and Qiang Liu. Flow Straight and Fast: Learning to Generate and Transfer Data with Rectified Flow. 2022. arXiv preprint arXiv:2209.03003. https://arxiv.org/abs/2209.03003.

Xu, J., Guo, Z., He, J., Hu, H., He, T., Bai, S., et al. Qwen2. 5-omni technical report. 2025. arXiv preprint arXiv:2503.20215. https://arxiv.org/abs/2503.20215.

* cited by examiner

TEXT-TO-SPEECH SYNTHESIS USING GENERATIVE ARTIFICIAL INTELLIGENCE MODELS

TECHNICAL FIELD

This disclosure relates to audio and text processing. More specifically, this disclosure relates to systems and methods for generating natural-sounding human speech based on text input.

BACKGROUND

Text-to-speech (TTS) synthesis generally refers to the generation of an audio signal based on text input. TTS synthesis can be used in automated systems that require generation of natural human speech. These systems may be used in movies, television shows, animations, video games, and similar applications.

Existing solutions can produce highly natural speech, but they still exhibit certain limitations. Specifically, many current systems are relatively slow and require powerful artificial intelligence (AI) accelerators to operate effectively. Furthermore, conventional systems often lack fine-grained control over the emotional content of the generated speech, or they require explicit specification of precise emotions at specific moments in the speech.

Another common limitation of existing systems is their inability to clone a particular voice identity and speaking style without undergoing extensive re-training of a speech generation model. In some existing solutions, specific models are created and trained for each specific speaker. Specifically, for each further speaker, the existing model may need to be retrained to create a model trained for this specific speaker. However, creation and storing of a separate model for each speaker may require extensive generation and memory capacities.

In general, conventional TTS systems can be broadly classified into diffusion systems and autoregressive systems. Diffusion systems typically employ a rectified flow matching approach. Autoregressive systems are models that generate each output token sequentially, with each token conditioned on the previously generated ones. While both types of systems can produce speech of good quality and expressiveness, they differ in generation speed.

Some conventional TTS systems (e.g., the Parakeet system) are capable of generating dialog-based conversations with zero-shot voice cloning. In these systems, the architecture is autoregressive and includes a large transformer-based encoder-decoder model. Speech tokens are generated sequentially, which limits the ability to accelerate generation. Furthermore, these systems require extensive memory resources to operate.

Other conventional TTS systems (e.g., CosiVoice, CosyVoice 2, and Qwen2.5-Omni) often utilize autoregressive token generation followed by a diffusion token-to-speech conversion. Although these systems can produce high-quality speech audio, they typically lack conversational context and are considerably slower due to their autoregressive stage.

Some conventional TTS systems, such as F5-TTS and E2-TTS systems, are pure flow matching-based. These systems provide high generation speed but lack conversational context. Additionally, these systems do not allow real-time control of speech style, as style and emotions are primarily determined by a fixed reference audio sample representing the speaker.

Certain conventional flow-matching systems (e.g., the ELaTE system) are high-speed speech generation models that produce expressive speech using flow matching. However, they require explicit emotion tokens to be included in the input text to achieve expressiveness.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one example embodiment of the present disclosure, a system for generating human speech audio in a conversation using a trained generative AI model is provided. The system may include a speaker encoder, a dialog context encoder, and a speech generator. The speaker encoder may be configured to receive at least one audio sample associated with at least one speaker. The speaker encoder may be further configured to extract a speaker embedding representing a voice identity and a speaking style of the at least one speaker. The dialog context encoder may be configured to receive a dialog history. The dialog history may include prior responses. The dialog context encoder may be further configured to generate a dialog context embedding based on the dialog history. The speech generator may be configured to receive the speaker embedding, the dialog context embedding, and a text input associated with the conversation. The speech generator may be further configured to generate at least one emotional audio response for the at least one speaker using the speaker embedding, the dialog context embedding, and the text input and without retraining the trained generative AI model.

According to another embodiment of the present disclosure, a method for generating human speech audio in a conversation using a trained generative AI model is provided. The method may commence with receiving a text input. The text input may represent a portion of the conversation. The method may proceed with receiving dialog context associated with the conversation. The method may further include receiving information that represents at least one voice and speaking style of at least one speaker in the conversation. The method may proceed with generating the at least one voice and speaking style based on the received information. The method may further include generating at least one emotional audio response for the at least one speaker using the at least one voice and speaking style and without retraining the trained generative AI model.

According to yet another example embodiment of the present disclosure, the operations of the above-mentioned method are stored on a non-transitory computer-readable medium storing instructions that, when executed by one or more processors, cause the one or more processors to perform operations of a method for generating human speech audio in a conversation using a trained generative AI model.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
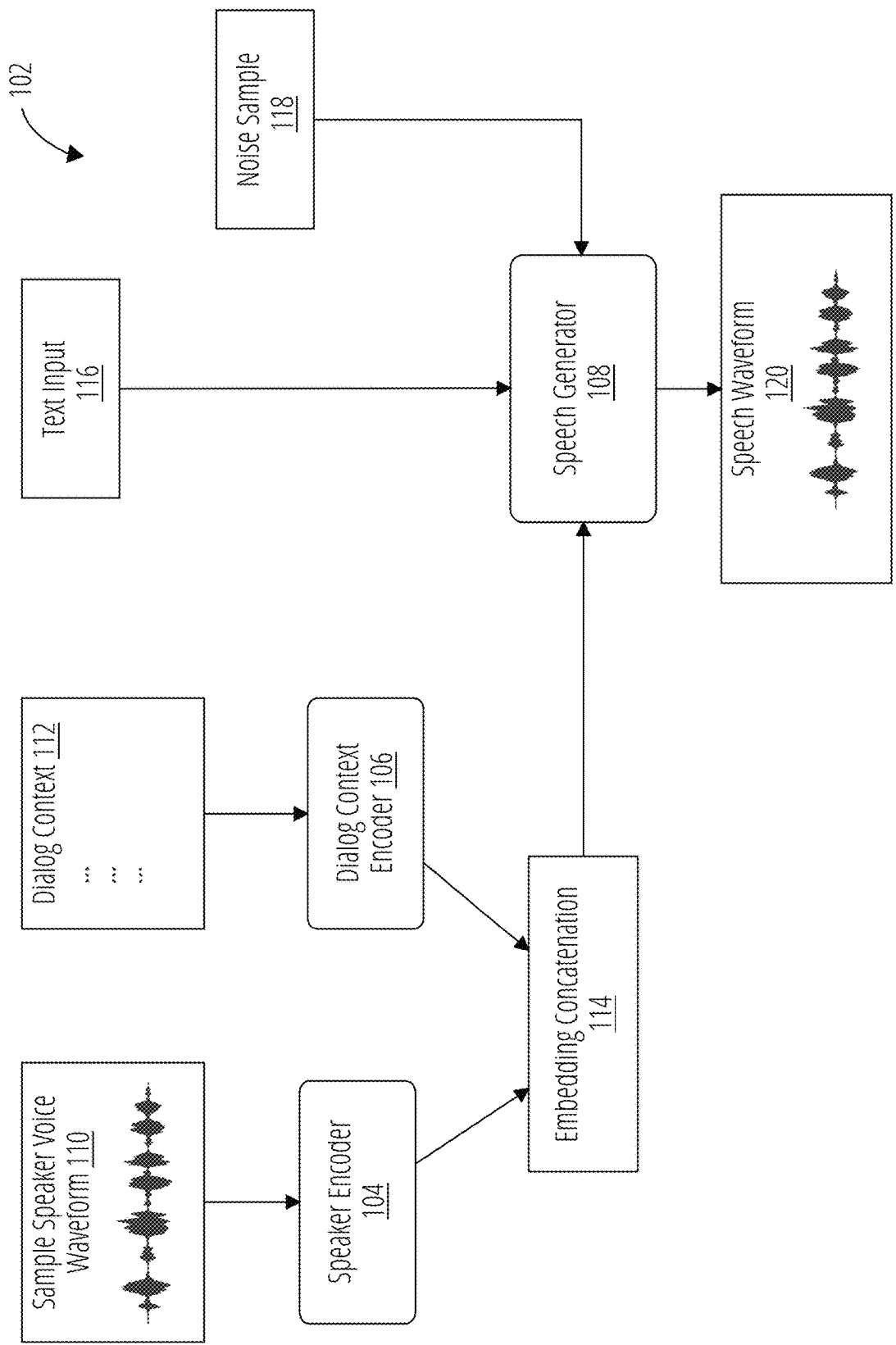
FIG. 1 shows a block diagram of a system for generating human speech audio in a conversation using a trained generative AI model, according to an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

This disclosure relates to systems and methods for generating human speech audio in a conversation using a trained generative AI model. According to an example embodiment of the present disclosure, a system for generating human speech audio in a conversation using a trained generative AI model is configured to generate a speech audio based on a text input, a dialog context, and information on a voice and speaking style of a speaker. The system may use a relatively short audio sample to extract a voice identity and a speaking style of the speaker without the requirement of retraining the trained generative AI model for each speaker. This provides the system with instant voice identity- and speaking style-cloning capabilities. The flexibility of representation of the speaker makes the system capable of creating further speaker identities by combining two or more existing representations of the speaker. Speed of the TTS synthesis achieved by the system allows for faster-than-real time voice generation, which enables providing cost-effective services even on older hardware (e.g., previous-generation hardware having limited resources). The system may be trained on multilingual data and, as a result, may be configured to generate fluent speech in all or any of the multiple languages without the need to have separate systems for each language.

The operation of the system may be optimized for natural speech generation in a conversation. The system may be configured to generate an audio response based on the most recent 5 to 10 responses in a conversation. The system may extract the information on at least one voice and speaking styles of at least one speaker from a sample short audio clip having the duration of about 3 to 10 seconds. The system may generate responses having any duration. The context of the conversation provides the system with the capability to automatically generate a response including highly expressive and relevant emotional content without the need to explicitly specify that highly expressive and relevant emotional content is needed in the response. Accordingly, the system of the present disclosure provides faster than real-time high quality expressive text-to-speech conversion that does not require extensive hardware resources and, hence, can be run on older versions of hardware.

The system of the present disclosure uses rectified flow matching generation. To accelerate the rectified flow matching generation, shortcut models and rectified flow may be used. Shortcut models are generative models that use a single network and training phase in order to produce high-quality samples in a single or multiple sampling stages. Rectified flow is a modified or constrained flow of data within a neural network, where the direction or magnitude of the flow is adjusted (i.e., "rectified") to improve convergence, stability, or representation quality. The rectified flow is an approach to learning neural ordinary differential equation models to transport between two empirically observed distributions.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIG. 1 shows a block diagram of a system 102 for generating human speech audio in a conversation using a trained generative AI model, according to an example embodiment. As shown in FIG. 1, the system 102 may include a speaker encoder 104, a dialog context encoder 106, and a speech generator 108. In an example embodiment, all elements of the system 102 may be neural network models.

The speaker encoder 104, the dialog context encoder 106, and the speech generator 108 may be trained jointly using the rectified flow matching technique. In machine learning, the rectified flow matching is a generative model that establishes linear relations between the distribution of data and noise.

The system 102 may further include a module configured to precompute and cache speaker embeddings during inference to reduce latency. After the training of the modules of the system 102 is concluded, the system 102 may use precomputed and cached speaker embeddings to speed up the generation process. The speech generator 108 may use an ordinary differential equation solver to generate speech voice using the rectified flow matching model.

More specifically, as shown in FIG. 1, the speaker encoder 104 may be configured to receive at least one audio sample associated with at least one speaker. The at least one audio sample may include an audio sample of speaker voice shown as a sample speaker voice waveform 110 in FIG. 1. The speaker encoder 104 may extract a speaker embedding from the sample speaker voice waveform 110. The speaker embedding may represent a voice identity and a speaking style of the speaker.

In natural language processing, an embedding (may be referred to as "a word embedding" or "a phrase embedding")

is representation of a word or a phrase, respectively, in the form of a real-valued vector that encodes its semantic meaning. Embeddings representing words with similar meanings are positioned closer together in the vector space. The embeddings are typically obtained using language models.

The dialog context encoder 106 may be configured to receive a dialog context 112 associated with the conversation of the speaker. In an example embodiment, the dialog context 112 may include a dialog history. The dialog history may include prior responses in the conversation. In an example embodiment, the dialog history may include between 5 and 10 dialog responses.

Based on the dialog context 112 that includes the dialog history, the dialog context encoder 106 may generate a dialog context embedding. The speaker embedding provided by the speaker encoder 104 and the dialog context embedding provided by the dialog context encoder 106 may be concatenated in a block shown as embedding concatenation 114.

The speech generator 108 may be configured to receive the speaker embedding and the dialog context embedding concatenated in the embedding concatenation 114. The speech generator 108 may further receive a text input 116 associated with the conversation. The text input 116 may include a target text to be generated using the speaker characteristics and pronounced in the generated speech. In an example embodiment, the speech generator 108 may further optionally receive a noise sample 118. In an example embodiment, the noise sample 118 may be received in the form of noised latents. In the context of machine learning and generative models, latents refer to hidden or unobserved variables that represent underlying features of the data. In generative models, latents may be the compressed representations or encoded features of the input data.

The speech generator 108 may generate at least one emotional audio response for the speaker. The at least one emotional audio response may be generated based on the speaker embedding, the dialog context embedding, the text input 116, and optionally the noise sample 118. The at least one emotional audio response may be generated in the form of a speech waveform 120. The generation of the at least one emotional audio response may be performed without retraining the trained generative AI model, i.e., without retraining any of the speaker encoder 104, the dialog context encoder 106, and the speech generator 108.

Accordingly, the generated at least one emotional audio response may not copy the speaker characteristics present in the sample speaker voice waveform 110, but may have speaker characteristics of a target speaker whose voice needs to be generated. In some example embodiments, the target speaker may be a new speaker that needs to have a voice and speaking style that never existed before. The system 102 may be configured to generate emotional audio responses for a plurality of new speakers without retraining the trained generative AI model.

Moreover, the generated at least one emotional audio response may not copy the emotions present in the sample speaker voice waveform 110, but may include emotions determined based on dialog context 112. In an example embodiment, the emotions may be represented in the at least one emotional audio response using a plurality of characteristics of voice and speech, such as pitch, voice intensity, speech rate, timbre, articulation, pronunciation, pauses in the speech, intonation, and so forth. The combination of these characteristics may be used to indicate an emotional state (e.g., sadness, happiness, anger) of the speaker.

The system 102 may further include a pretrained voice encoder (also referred to as a pretrained encoder) and a pretrained voice decoder (also referred to as a pretrained decoder), which may be configured to accelerate the training and inference. The system 102 may use EnCodec encoder operating at a sampling rate of 24 kHz as the voice encoder. The EnCodec encoder is the EnCodec model. In machine learning, the EnCodec model is a straightforward, streaming, convolutional encoder-decoder architecture that incorporates a sequential modeling component applied to the latent representation on both the encoder and decoder sides.

The voice encoder may significantly and effectively lower voice audio dimensionality by applying strong information compression. The system 102 may use the Vocos vocoder as the voice decoder. In machine learning, the Vocos vocoder is a generative adversarial network (GAN)-based vocoder trained to generate complex Short-Time Fourier Transform (STFT) coefficients from an audio clip. This GAN model uses Fourier-based time-frequency representation as the target data distribution for the speech generator 108. The Vocos vocoder may generate high quality waveforms based on magnitude spectrograms.

In an example embodiment, the training of the system 102 may be split into two phases. The first phase is a pretraining phase that may use a dataset including transcribed multilingual speech waveforms. This dataset may include about 3,000 hours of transcribed multilingual speech waveforms. As dialogs may be difficult to acquire for training purposes, the data used in the pretraining phase do not have to be dialogs. The second phase is a fine-tuning phase that may use a dataset including high-quality dialog recordings. The dataset of high-quality dialog recordings may be a small high-quality dialog dataset. During the training, one or more conditioning signals representing the dialog context and speaker characteristics may be randomly omitted to improve generation quality using the classifier-free diffusion guidance technique during inference. Audio transcriptions for the dataset may be computed using common automatic speech recognition tools, which makes the data collection process more efficient and cheaper.

In machine learning, classifier-free diffusion guidance is a technique used in generative diffusion models to steer the generation process toward a desired output without relying on an external classifier. During training, the model learns to generate outputs both with and without conditioning information, such as a text prompt and a speaker embedding. At inference time, the model combines the conditioned and unconditioned predictions using a guidance scale that enhances the influence of the conditioning signal. This approach improves the relevance and fidelity of generated outputs while maintaining training simplicity and flexibility. Classifier-free diffusion guidance may be adopted in text-to-speech generation models due to its efficiency and effectiveness in producing high-quality, prompt-aligned content.

Figure 2:
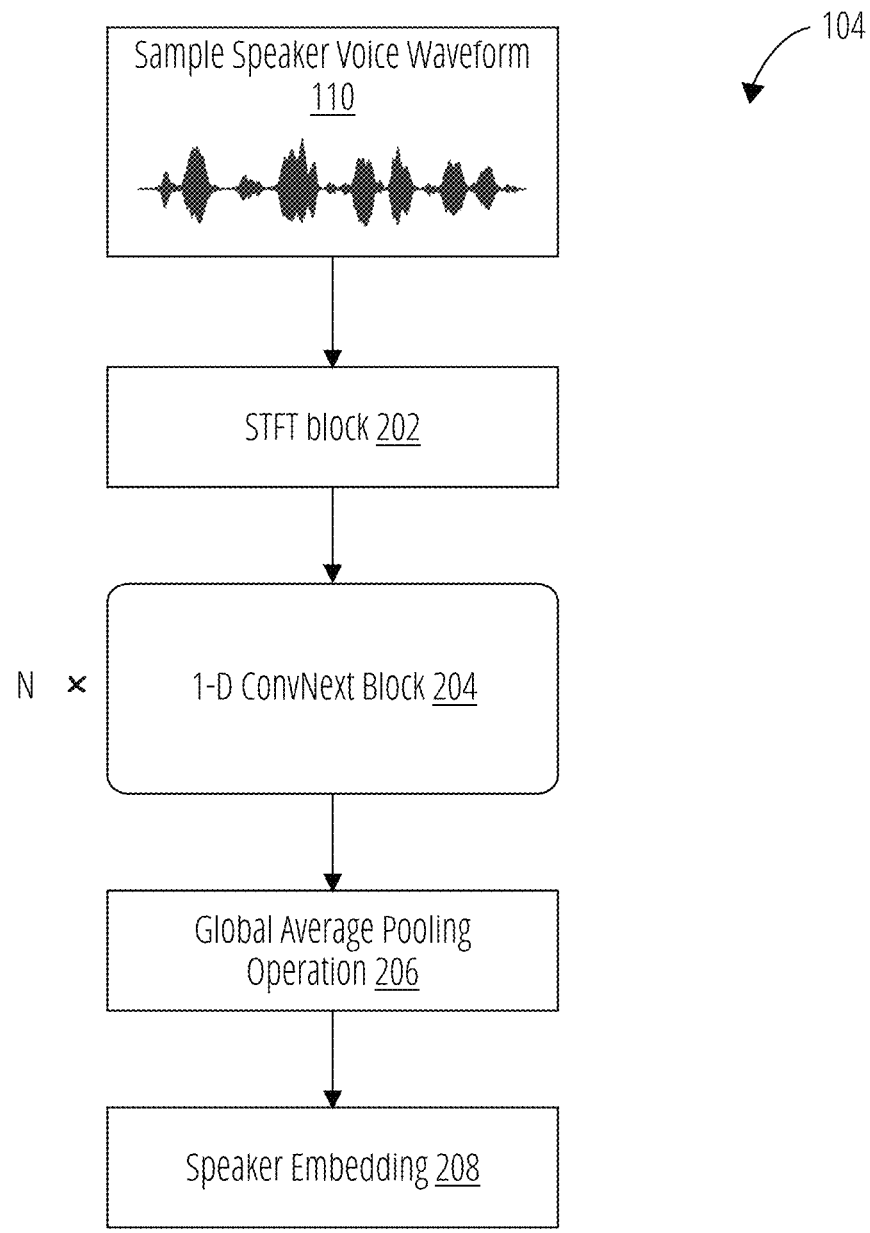
FIG. 2 is a block diagram illustrating a speaker encoder, according to an example embodiment.

FIG. 2 is a block diagram illustrating in detail the speaker encoder 104, according to an example embodiment. The speaker encoder 104 may be configured to receive a sample speaker voice waveform 110. The sample speaker voice waveform 110 may be a sample speech waveform of a target speaker. The target speaker is a speaker whose voice needs to be generated based on the input text. Upon receiving the sample speaker voice waveform 110, the speaker encoder 104 may use a pretrained audio compression codec to compute encoded audio tokens in an STFT block 202.

The speaker encoder 104 may also include one or more one-dimensional convolutional neural network blocks and a pooling operation configured to consolidate extracted features into the speaker embedding. More specifically, upon computing the encoded audio tokens, the encoded audio tokens may be embedded in a high dimensional embedding space of the style encoders. Embedded tokens then may pass through one or more one-dimensional convolutional neural network blocks shown in FIG. 2 as a plurality (e.g., N) of one-dimensional ConvNext V2 blocks 204. Upon passing through the ConvNext V2 block 204, the embedded tokens may then pass through by a global average pooling operation 206 to consolidate full audio sequence into a single speaker embedding vector.

In machine learning, ConvNeXt V2 is a convolutional neural network (CNN) architecture optimized for high performance in various machine learning tasks. The structure of the ConvNeXt V2 (including depthwise convolutions, large kernel sizes, and improved normalization techniques) makes it adaptable for modeling sequential and temporal patterns in data.

The minimal duration of the sample speaker voice waveform 110 may be around 3 seconds, while the maximum duration is not limited. In an example embodiment, the sample speaker voice waveform 110 may have a duration of between 3 seconds and 10 seconds. In some example embodiments, the sample speaker voice waveform 110 may include speech in one or more languages. During the training, only the embedding and convolutional layers are trained, while the EnCodec encoder (used as the voice encoder) may be frozen. The result provided by the speaker encoder 104 may include the speaker embedding vector that represents the speaker.

During the training, the speaker encoder 104 may learn to incorporate a voice identity, a speaking style, language, and accent of the speaker into a single multidimensional embedding vector. After the training, the system 102 may encode speaker embeddings before the speech generation starts, thereby saving computation time and resources. The fact that the speaker is a vector provides the system 102 with the capability to create further (i.e., new) speakers by applying linear interpolation in the embedding space. Thus, the system 102 provides the creation of a variety of speaking styles, accents, and identities without having to record audio samples for each new speaker.

Figure 3:
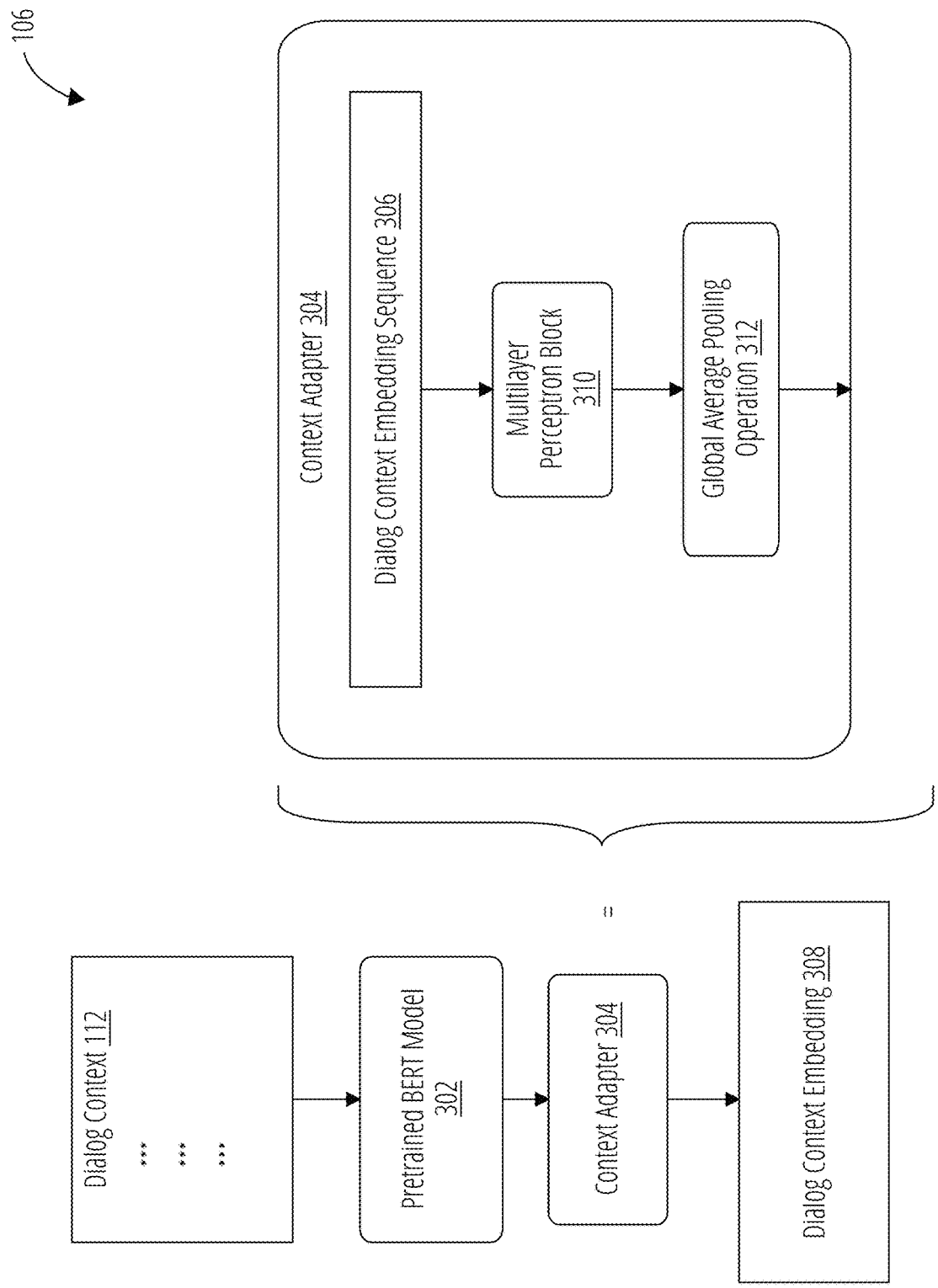
FIG. 3 is a block diagram illustrating a dialog context encoder, according to an example embodiment.

FIG. 3 is a block diagram illustrating in detail the dialog context encoder 106, according to an example embodiment. The dialog context encoder 106 may include a pretrained Bidirectional Encoder Representations from Transformers (BERT) model 302 and a trainable adapter module shown as a context adapter 304. The pretrained BERT model 302 and the context adapter 304 may be used to supply a vector of a dialog context embedding to the speech generator 108. In machine learning, the BERT model is a language model that has the encoder-only transformer architecture and learns to represent text as a sequence of vectors using self-supervised learning. The dialog context encoder 106 may rely on text representations computed by the pretrained BERT model 302. The trainable adapter module may be configured to aggregate semantic information from the dialog history into the dialog context embedding.

BERT models have shown to perform well on many language understanding tasks. For the task of natural speech-to-text conversion in the context of a dialog, it is crucial to obtain accurate emotional content of the audio response. Thus, the dialog context 112 including the contents of the last 5 to 10 dialog responses in the conversation may be provided to the pretrained BERT model 302 as input. Furthermore, the text input (i.e., target text), which is the last response in the conversation, may be provided to the pretrained BERT model 302 as input. The pretrained BERT model 302 may encode the input sequence into the semantically rich representation of the same sequence length. Then, the lightweight context adapter 304 may aggregate the resulting dialog context embedding sequence 306 into a dialog context embedding 308 represented by a single dialog context embedding vector.

During training, the pretrained BERT model 302 may be frozen and only the context adapter 304 may be trained. This partial freezing approach makes the system 102 capable of speeding up the training significantly, as the dialog context embeddings can be calculated for the entire training dataset before training the whole system 102. The context adapter 304 may learn to extract emotional context from the dialog semantic representation to use it as a condition that drives speech audio generation.

As shown in FIG. 3, the context adapter 304 may include a multilayer perceptron block 310, which may be followed by a global average pooling operation 312. A multilayer perceptron is a type of feedforward artificial neural network composed of an input layer, one or more hidden layers, and an output layer, where each layer consists of interconnected neurons that apply nonlinear transformations to learn complex patterns in data. The multilayer perceptron block 310 may have architecture similar to the architecture used in the BERT model. In the context adapter 304, the multilayer perceptron block 310 and the global average pooling operation 312 may be used to aggregate the dialog context embedding sequence 306 into the dialog context embedding 308.

Figure 4:
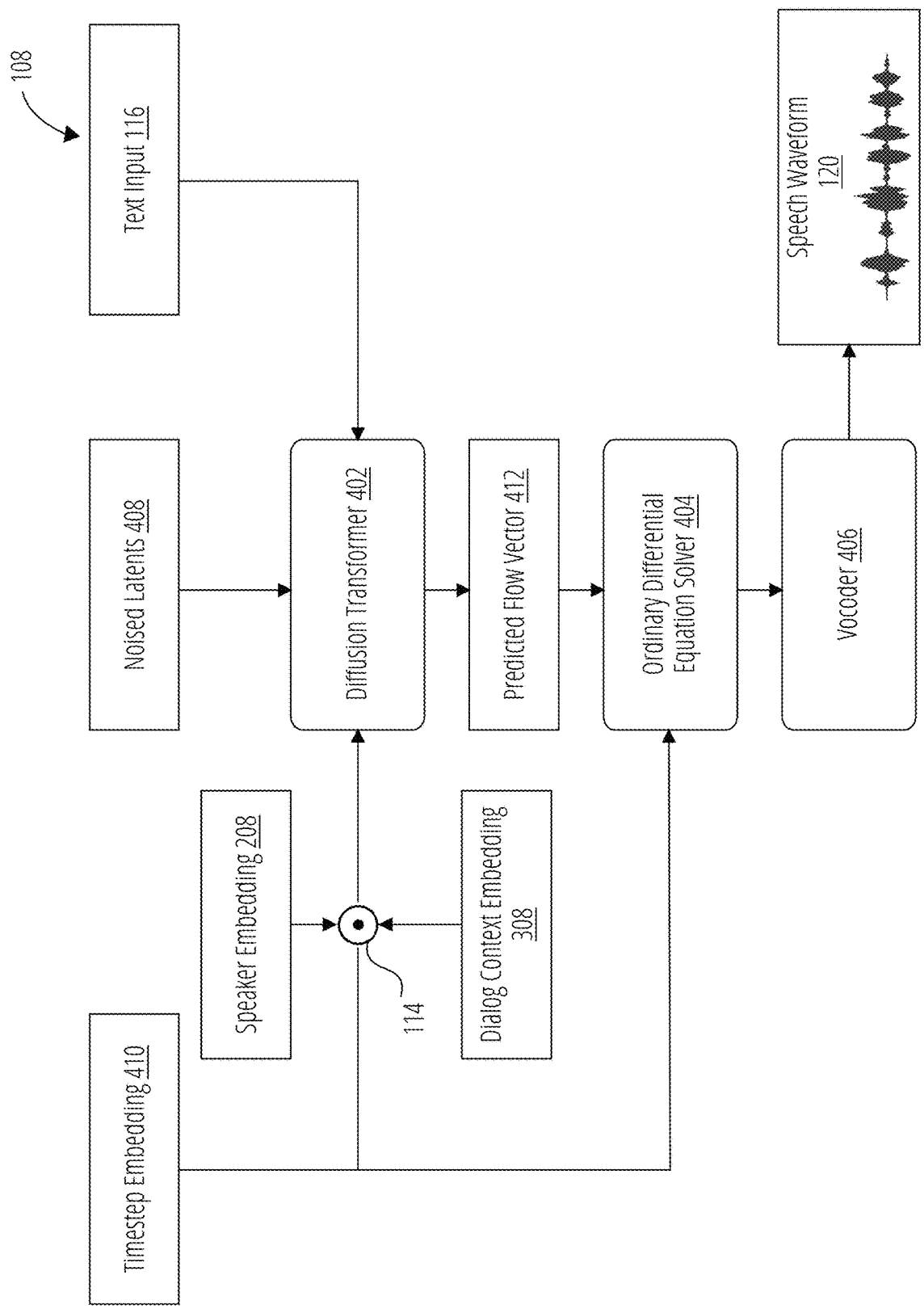
FIG. 4 is a block diagram illustrating a speech generator, according to an example embodiment.

FIG. 4 is a block diagram illustrating in detail the speech generator 108, according to an example embodiment. The speech generator 108 may include a diffusion transformer 402, an ordinary differential equation solver 404, and a vocoder 406. According to the conditional generation performed by the rectified flow matching model, the inputs provided to the speech generator 108 are text input 116 and noised spectral representations shown as noised latents 408. The text input 116 is target text to be pronounced in the generated speech. A conditional signal for the speech generator 108 may include three components, namely a timestep embedding 410, speaker embedding 208, and dialog context embedding 308. In machine learning, a timestep embedding is a numerical representation that captures information about the progression of a process over discrete steps. The timestep embedding converts a timestep (e.g., step one out of thousand in a diffusion process) into a vector that a neural network can process. The process associated with the timestep embedding 410 transforms real-valued timestep in the interval of 0 to 1 to a multidimensional vector using standard sinusoidal embeddings. This transformation may be performed by using a generative model having the architecture similar to the architecture of the FLUX model. In machine learning, the FLUX model is a generative model employing a rectified flow transformer architecture that is scaled to billions of parameters and enables generation of detailed and coherent visuals across various styles and subjects.

The speaker embedding 208 may be received from the speaker encoder 104, and the dialog context embedding 308 may be received from the dialog context encoder 106. All three embeddings may be concatenated in embedding concatenation 114 and passed as a condition to the diffusion transformer 402.

The diffusion transformer 402 may be configured to receive noised latents 408 and predict a flow vector 412 conditioned on the speaker embedding 208 and the dialog context embedding 308. Specifically, the diffusion transformer 402 may learn to predict the flow vector 412 according to the rectified flow matching technique based on the inputs and the conditions.

The ordinary differential equation solver 404 may be configured to generate speech latents from the predicted flow vector 412. Accordingly, the ordinary differential equation solver 404 may use the predicted flow vectors 412 to produce the final representation of the generated speech starting from a pure noise vector. Thus, based on the same conditions, the speech generator 108 may sample many plausible renditions of the target speech. In an example embodiment, the system 102 may use a Euler solver as the ordinary differential equation solver 404.

The final step of the generation is performed by the vocoder 406 configured to generate a waveform from the speech latents. The vocoder 406 may transform the spectral representation to a waveform audio signal shown as a speech waveform 120. The speech waveform 120 is a human speech audio generated in the conversation. In an example embodiment, the system 102 may use the pretrained Vocos vocoder model as the vocoder 406. The vocoder 406 may be frozen during the training of the system 102.

Figure 5:
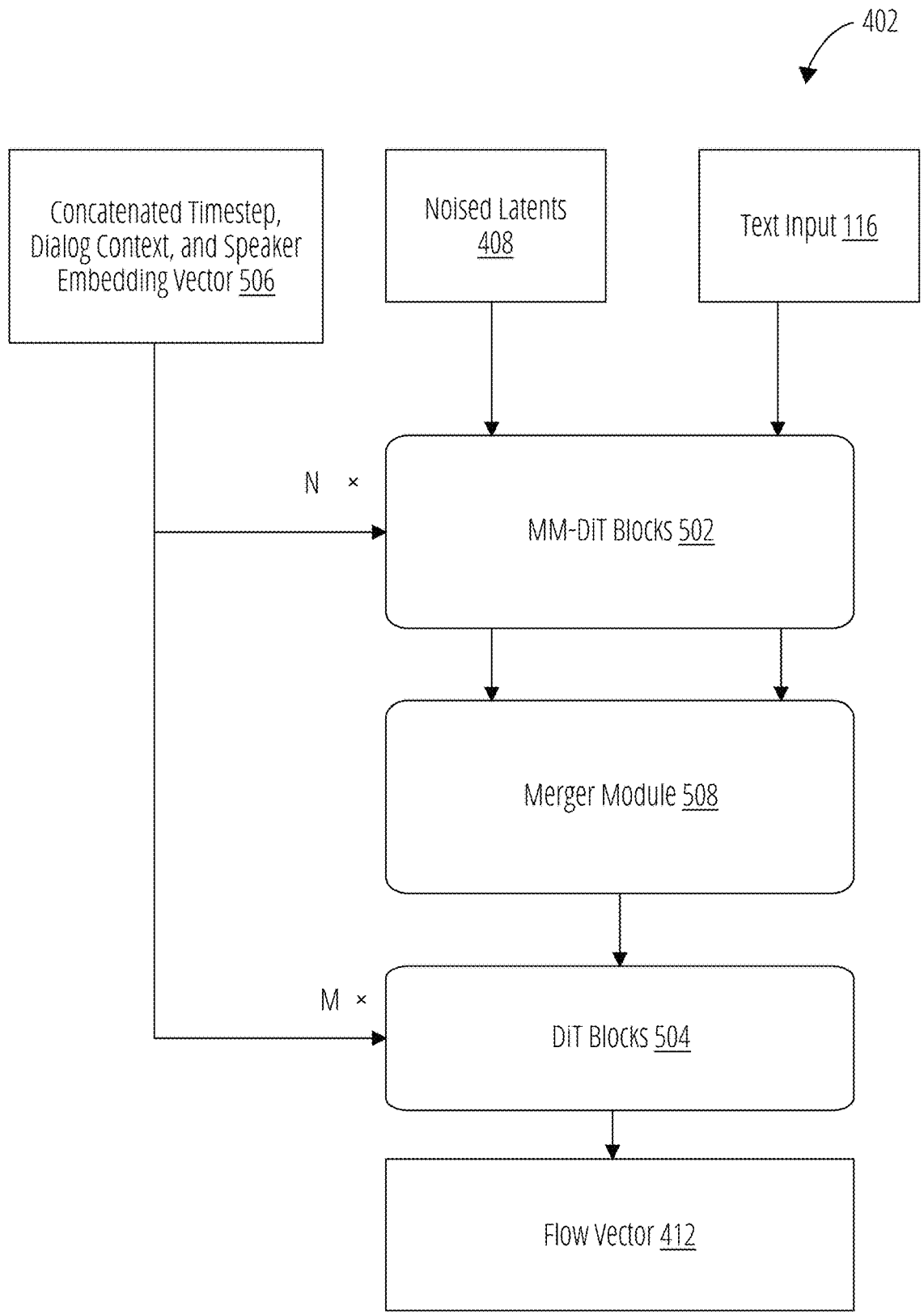
FIG. 5 is a block diagram illustrating a diffusion transformer, according to an example embodiment.

FIG. 5 is a block diagram illustrating in detail the diffusion transformer 402, according to an example embodiment. The architecture of the diffusion transformer 402 is similar to the architecture of the FLUX model. The diffusion transformer 402 performs two phases of processing, namely a double stream phase and a single stream phase. In the double stream phase (first phase), the input audio spectral representation is separated from target text representation. The double stream phase is performed to align the text sequence to the audio sequence and consider big modalities differences between the two representations. After the double stream phase, the two sequences are merged with simple projection into a single audio stream, which goes into the single stream phase (second phase). The double stream phase uses a number (e.g., N) of stacked multimodal (MM) diffusion transformer (DiT) blocks shown as MM-DiT block 502, while the single stream uses a number (e.g., M) of stacked plain diffusion transformer blocks shown as DiT block 504. Encodings for the speaker, dialog context, and timestep are concatenated into a single concatenated timestep, dialog context, and speaker embedding vector 506, which is used as a conditional signal across all blocks of the diffusion transformer 402. Similarly to the FLUX model, the conditioning may be performed via adaptive layer normalizations.

The concatenated timestep, dialog context, and speaker embedding vector 506, the noised latents 408, and the text input 116 may be provided to the MM-DiT blocks 502. The MM-DiT blocks 502 may process the received input and provide the processing results to a merger module 508 for merging. The DiT block 504 may receive the concatenated timestep, dialog context, and speaker embedding vector 506 and the merged results from the merger module 508. Upon processing the received data, the DiT block 504 may provide a predicted flow represented by the flow vector 412.

Figure 6:
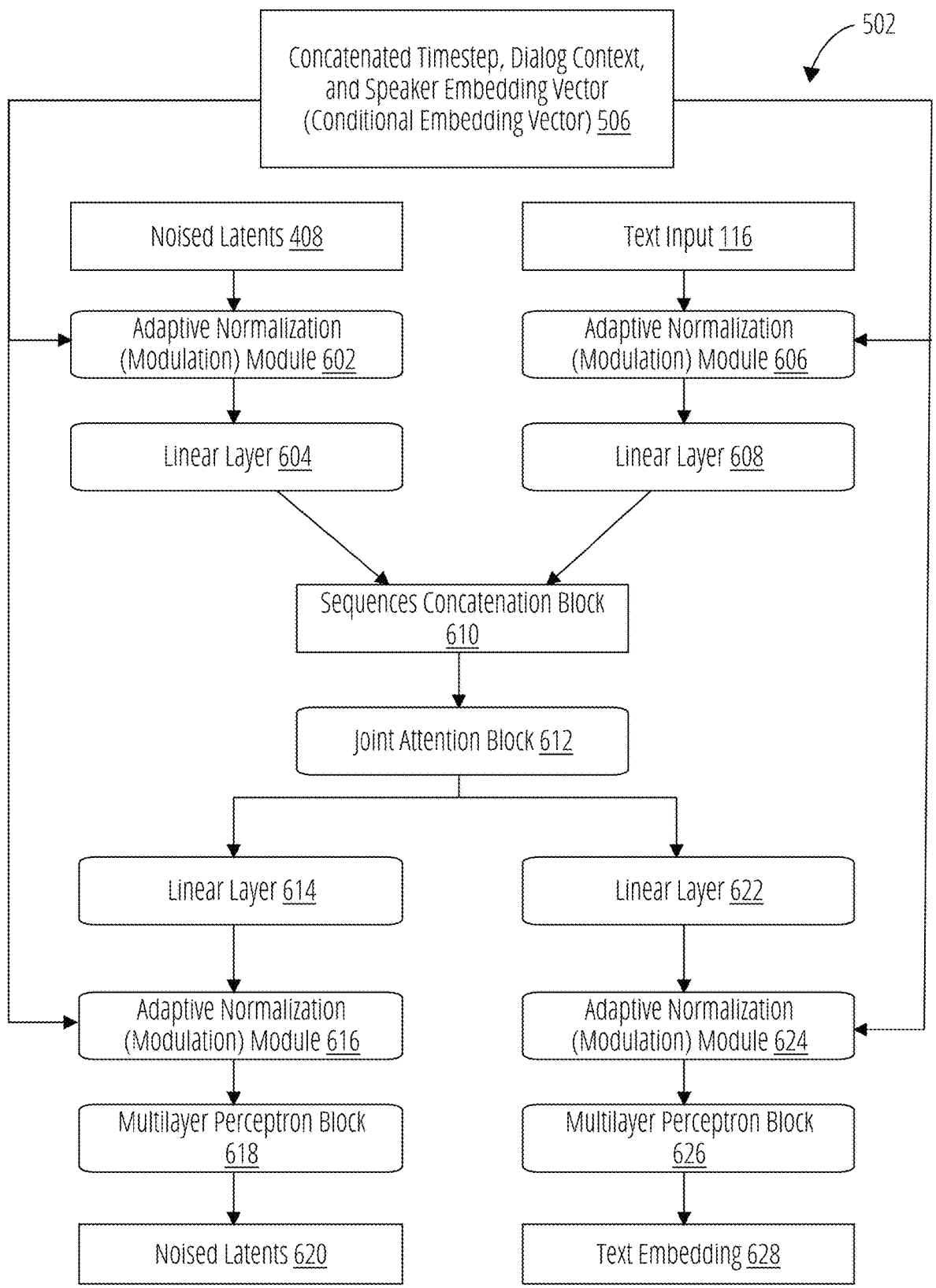
FIG. 6 is a block diagram illustrating an MM-DiT block, according to an example embodiment.

FIG. 6 is a block diagram illustrating in detail the MM-DiT block 502, according to an example embodiment. The architecture of the MM-DiT block 502 is based on the architecture used in the FLUX model. The MM-DiT block 502 receives three embedding vectors as inputs. The embedding vectors include a conditional embedding vector, an embedding of noised latents 408, and an embedding of the text input 116. The conditional embedding vector is a concatenation of timestep embedding, speaker embedding, and dialog context embedding, shown as the concatenated timestep, dialog context, and speaker embedding vector 506. The conditional embedding vector is used in modules of adaptive normalization (modulation) and linear layers. The embeddings of the noised latents 408 and text input 116 represent two different modalities in the system 102. In the context of data processing, modalities of data refer to the different forms or types of data that can be perceived or processed by a system.

The concatenated timestep, dialog context, and speaker embedding vector 506 and the noised latents 408 are passed through an adaptive normalization (modulation) module 602 and a linear layer 604 to obtain a first embedding sequence. Similarly, the concatenated timestep, dialog context, and speaker embedding vector 506 and the text input 116 are passed separately through an adaptive normalization (modulation) module 606 and a linear layer 608 to obtain a second embedding sequence. The resulting first embedding sequence and second embedding sequence are concatenated in a sequences concatenation block 610 on the sequence dimension and are then used in a joint attention block 612. This allows the two different modalities to interact with each other. The goal of the interaction of modalities is to align text sequence to the generated speech sequence and to enrich the representations for each modality by taking into account both sequences at the same time. After the joint attention block 612, the first sequence of the two sequences is passed through a linear layer 614, an adaptive normalization (modulation) module 616, and a multilayer perceptron block 618 to obtain noised latents 620. The concatenated timestep, dialog context, and speaker embedding vector 506 are also provided as input to the adaptive normalization (modulation) module 616. The second sequence is independently passed through a linear layer 622, an adaptive normalization (modulation) module 624, and a multilayer perceptron block 626 to obtain text embedding 628. The concatenated timestep, dialog context, and speaker embedding vector 506 is also provided as input to the adaptive normalization (modulation) module 624.

Figure 7:
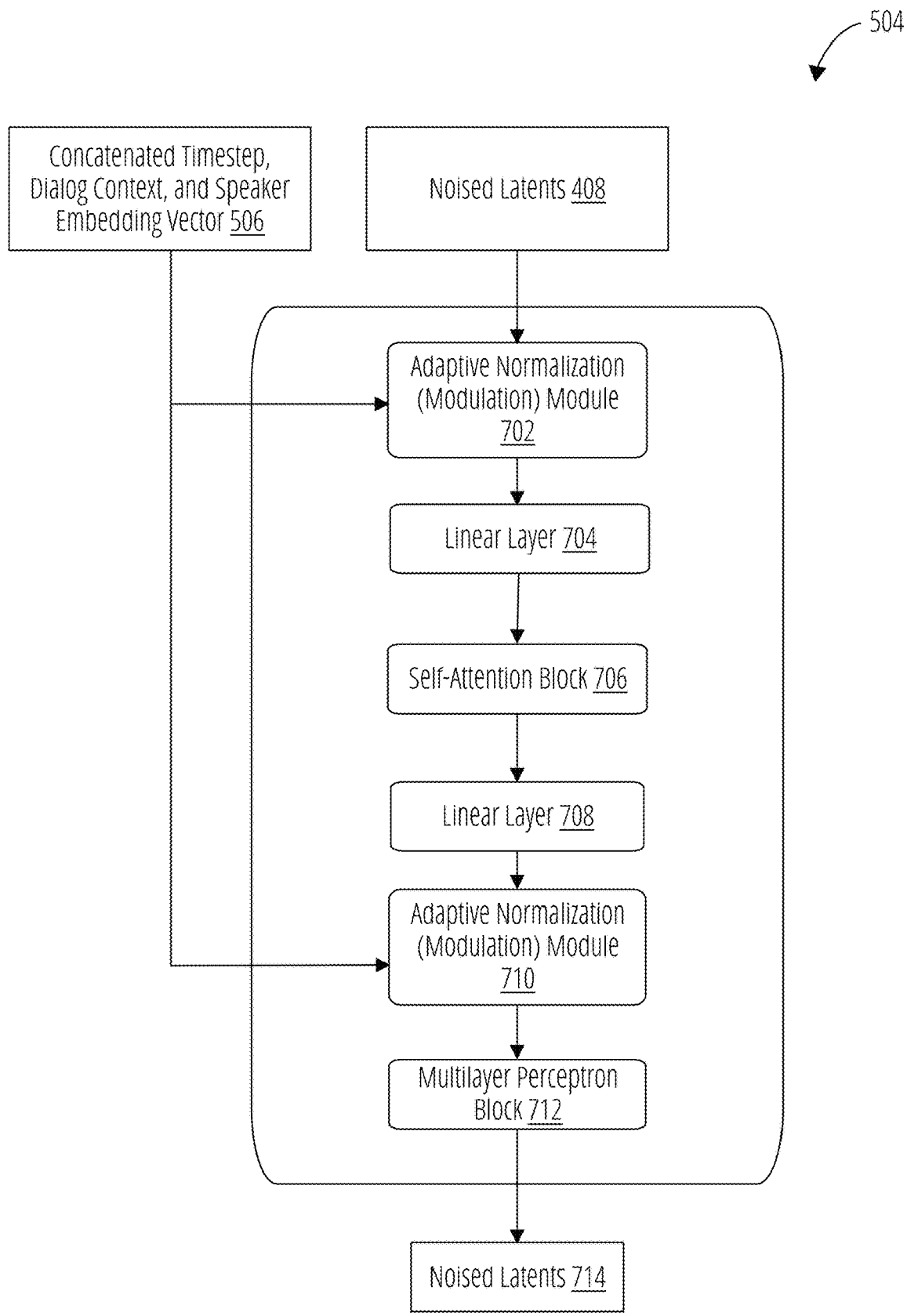
FIG. 7 is a block diagram illustrating a DiT block, according to an example embodiment.

FIG. 7 is a block diagram illustrating in detail a DiT block 504, according to an example embodiment. The architecture of the DiT block 504 is based on the architecture used in the FLUX model. The DiT block 504 is used on the merged text and spectral sequences after they are processed and aligned by the MM-DiT blocks 502. As in case of the MM-DiT blocks 502, the conditional embedding vector is a concatenation of the timestep embedding, speaker embedding, and dialog context embedding, shown as the concatenated timestep, dialog context, and speaker embedding vector 506. The concatenated timestep, dialog context, and speaker embedding vector 506 affects the generation in the same way as in the MM-DiT blocks 502, namely using modules of adaptive normalization (modulation) and linear layers.

The spectral latents sequence is the input sequence, which goes through the modulation and linear blocks before a self-attention layer enriches each individual sequence element taking into account the whole sequence. Specifically, the concatenated timestep, dialog context, and speaker embedding vector 506 and the noised latents 408 are passed sequentially through an adaptive normalization (modulation) module 702, a linear layer 704, and a self-attention block 706. The self-attention used in the self-attention block 706 is a mechanism used in machine learning to capture dependencies and relationships within input sequences.

The resulting sequence is then passed through a linear layer 708, an adaptive normalization (modulation) module 710, and a multilayer perceptron block 712 to obtain noised latents 714.

Figure 8:
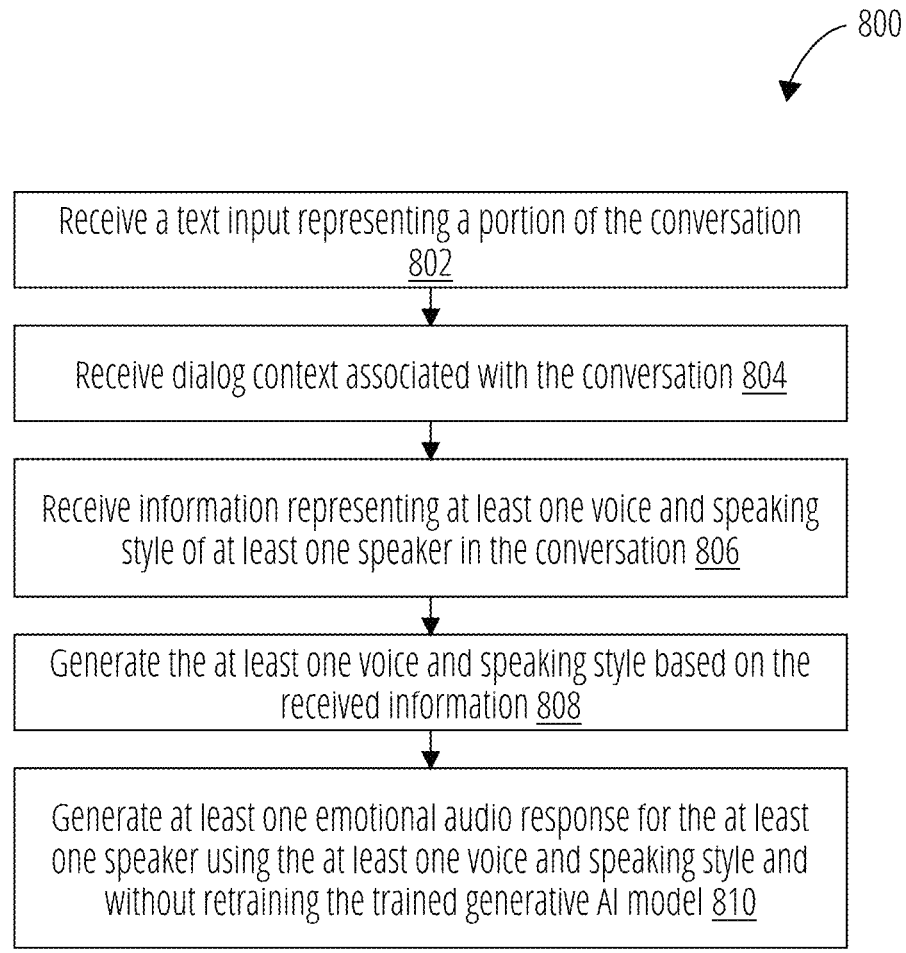
FIG. 8 illustrates a method for generating human speech audio in a conversation using a trained generative AI model, according to an example embodiment.

FIG. 8 is a flow chart showing method 800 for generating human speech audio in a conversation using a trained generative AI model, according to some example embodiments. In some embodiments, the operations of the method 800 may be combined, performed in parallel, or performed in a different order. The method 800 may also include additional or fewer operations than those illustrated. The method 800 may be performed by processing logic that comprises hardware (e.g., decision making logic, dedicated logic, programmable logic, and microcode), software (such as software run on a general-purpose computer system or a dedicated machine), or a combination of both.

In block 802, the method 800 may commence with receiving a text input. The text input may represent a portion of the conversation. In block 804, the method 800 may proceed with receiving dialog context associated with the conversation. In block 806, the method 800 may include receiving information that represents at least one voice and speaking style of at least one speaker in the conversation.

The method 800 may proceed in block 808 with generation of the at least one voice and speaking style based on the received information. In an example embodiment, the generation of at least one voice and speaking style may commence with receiving at least one audio sample associated with the at least one speaker and proceed with extracting features corresponding to a voice identity and a speaking style from the at least one audio sample. In an example embodiment, the at least one audio sample may have a duration of between 3 seconds and 10 seconds. In some example embodiments, the at least one audio sample may include speech in one or more languages.

Based on the extracted features, a speaker embedding representing the at least one voice and speaking style may be generated. In block 810, the method 800 may include generating at least one emotional audio response for the at least one speaker using the at least one voice and speaking style. The generation of the at least one emotional audio response may be performed without retraining the trained generative AI model.

In an example embodiment, the generation of the at least one emotional audio response may be further based on a dialog history of prior responses in the conversation. In some example embodiments, the dialog history may include between 5 and 10 dialog responses.

In an example embodiment, training of a generative AI model to obtain the trained generative AI model may include pretraining the generative AI model using a dataset that includes transcribed multilingual speech waveforms. Training of the generative AI model may further include fine-tuning using a dataset that includes high-quality dialog recordings.

During training of the generative AI model, one or more conditional signals representing the dialog context and speaker characteristics may be randomly omitted to improve generation quality using classifier-free diffusion guidance during inference.

Figure 9:
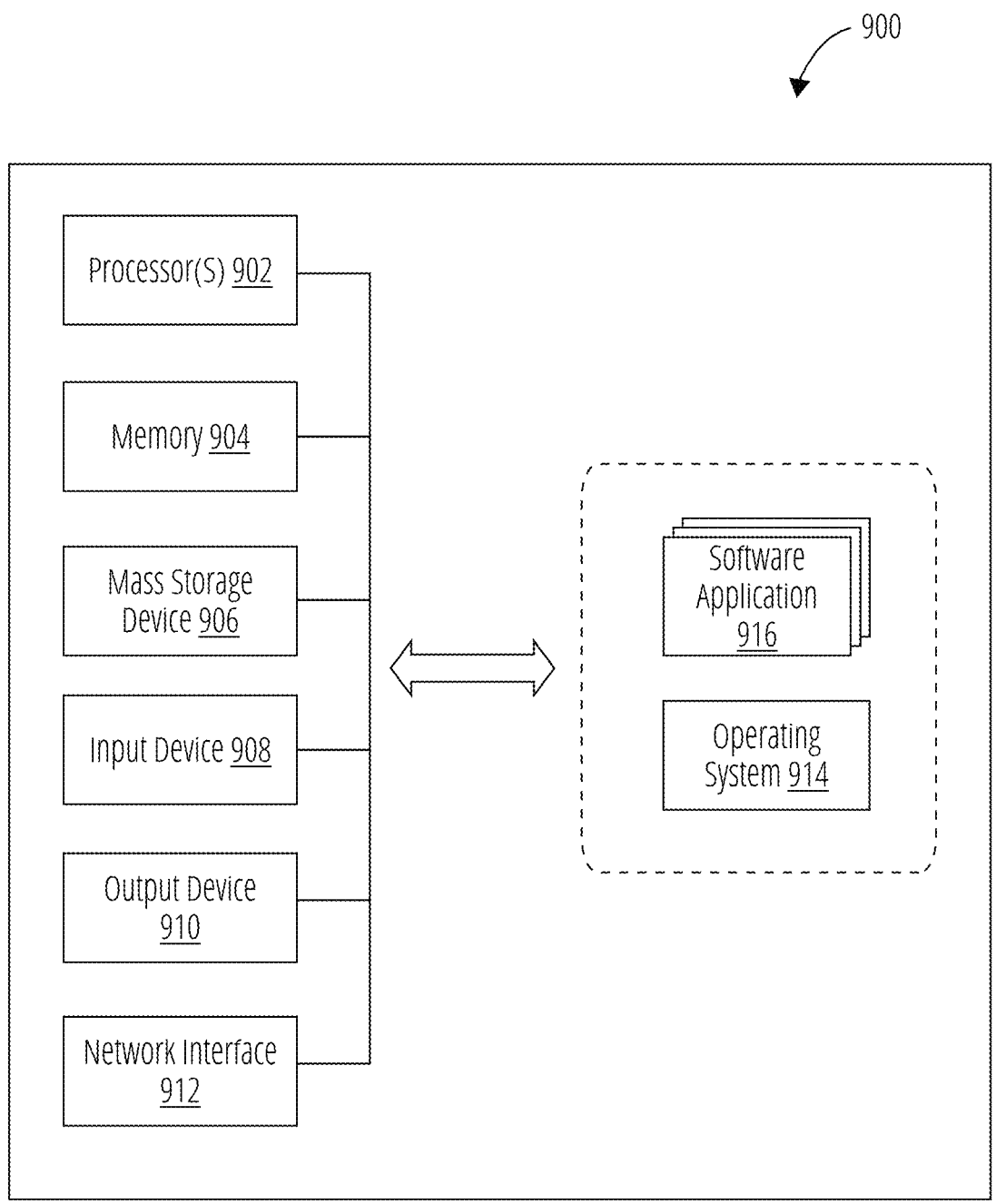
FIG. 9 is a high-level block diagram illustrating an example computer system, within which a set of instructions for causing the machine to perform any one or more of the methodologies discussed herein can be executed.

FIG. 9 is a high-level block diagram illustrating an example computer system 900, within which a set of instructions for causing the machine to perform any one or more of the methodologies discussed herein can be executed. The computer system 900 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. In some embodiments, the computer system 900 is an example of the system 102 shown in FIG. 1. Notably, FIG. 9 illustrates just one example of the computer system 900 and, in some embodiments, the computer system 900 may have fewer elements/modules than shown in FIG. 9 or more elements/modules than shown in FIG. 9.

The computer system 900 may include one or more processor(s) 902, a memory 904, one or more mass storage devices 906, one or more input devices 908, one or more output devices 910, and a network interface 912. The processor(s) 902 are, in some examples, configured to implement functionality and/or process instructions for execution within the computer system 900. For example, the processor(s) 902 may process instructions stored in the memory 904 and/or instructions stored on the mass storage devices 906. Such instructions may include components of an operating system 914 or software applications 916. The computer system 900 may also include one or more additional components not shown in FIG. 9.

The memory 904, according to one example, is configured to store information within the computer system 900 during operation. The memory 904, in some example embodiments, may refer to a non-transitory computer-readable storage medium or a computer-readable storage device. In some examples, the memory 904 is a temporary memory, meaning that a primary purpose of the memory 904 may not be long-term storage. The memory 904 may also refer to a volatile memory, meaning that the memory 904 does not maintain stored contents when the memory 904 is not receiving power. Examples of volatile memories include random access memories (RAM), dynamic random access memories (DRAM), static random access memories (SRAM), and other forms of volatile memories known in the art. In some examples, the memory 904 is used to store program instructions for execution by the processor(s) 902. The memory 904, in one example, is used by software (e.g., the operating system 914 or the software applications 916). Generally, the software applications 916 refer to software applications suitable for implementing at least some operations of the methods for generating human speech audio in a conversation using a trained generative AI model as described herein.

The mass storage devices 906 may include one or more transitory or non-transitory computer-readable storage media and/or computer-readable storage devices. In some embodiments, the mass storage devices 906 may be configured to store greater amounts of information than the memory 904. The mass storage devices 906 may further be configured for long-term storage of information. In some examples, the mass storage devices 906 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

The input devices 908, in some examples, may be configured to receive input from a user through tactile, audio, video, or biometric channels. Examples of the input devices 908 may include a keyboard, a keypad, a mouse, a trackball, a touchscreen, a touchpad, a microphone, one or more video cameras, image sensors, fingerprint sensors, or any other device capable of detecting an input from a user or other source, and relaying the input to the computer system 900, or components thereof.

The output devices 910, in some examples, may be configured to provide output to a user through visual or auditory channels. The output devices 910 may include a video graphics adapter card, a liquid crystal display (LCD) monitor, a light emitting diode (LED) monitor, an organic LED monitor, a sound card, a speaker, a lighting device, an LED, a projector, or any other device capable of generating output that may be intelligible to a user. The output devices 910 may also include a touchscreen, a presence-sensitive display, or other input/output capable displays known in the art.

The network interface 912 of the computer system 900, in some example embodiments, can be utilized to communicate with external devices via one or more data networks such as one or more wired, wireless, or optical networks including, for example, the Internet, intranet, local area network, wide area network, cellular phone networks, Bluetooth radio, and an IEEE 902.11-based radio frequency network, Wi-Fi Networks®, among others. The network interface 912 may be a network interface card, such as an Ethernet card, an optical transceiver, a radio frequency transceiver, or any other type of device that can send and receive information.

The operating system 914 may control one or more functionalities of the computer system 900 and/or components thereof. For example, the operating system 914 may interact with the software applications 916 and may facilitate one or more interactions between the software applications 916 and components of the computer system 900. As shown in FIG. 9, the operating system 914 may interact with or be otherwise coupled to the software applications 916 and components thereof. In some embodiments, the software applications 916 may be included in the operating system 914. In these and other examples, virtual modules, firmware, or software may be part of the software applications 916.

Thus, systems and methods for generating human speech audio in a conversation using a trained generative AI model have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for generating human speech audio in a conversation using a trained generative AI model, the method comprising:
   receiving a text input representing a portion of the conversation;
   receiving a dialog context associated with the conversation;
   receiving information representing at least one voice and speaking style of at least one speaker in the conversation;
   generating the at least one voice and speaking style based on the information; and
   generating at least one emotional audio response for the at least one speaker using the at least one voice and speaking style and without retraining the trained generative AI model, wherein training a generative AI model to obtain the trained generative AI model comprises:
      pretraining using a dataset comprising transcribed multilingual speech waveforms; and
      fine-tuning using a dataset comprising high-quality dialog recordings.

2. The method of claim 1, wherein generating the at least one voice and speaking style comprises:
   receiving at least one audio sample associated with the at least one speaker;
   extracting features corresponding to a voice identity and a speaking style from the at least one audio sample; and
   generating a speaker embedding representing the at least one voice and speaking style based on the features.

3. The method of claim 2, wherein the at least one audio sample has a duration of between 3 seconds and 10 seconds.

4. The method of claim 2, wherein the at least one audio sample comprises speech in one or more languages.

5. The method of claim 1, wherein generating the at least one emotional audio response is further based on a dialog history of prior responses in the conversation.

6. The method of claim 5, wherein the dialog history comprises between 5 and 10 dialog responses.

7. The method of claim 1, wherein, during training, one or more conditional signals representing the dialog context and speaker characteristics are randomly omitted to improve generation quality using classifier-free diffusion guidance during inference.

8. A system for generating human speech audio in a conversation using a trained generative AI model, the system comprising:
   a speaker encoder configured to:
      receive at least one audio sample associated with at least one speaker; and
      extract a speaker embedding representing a voice identity and a speaking style of the at least one speaker;
      wherein the speaker encoder comprises:
         a pretrained audio compression codec;
         one or more one-dimensional convolutional neural network blocks; and
         a pooling operation configured to consolidate extracted features into the speaker embedding;
   a dialog context encoder configured to:
      receive a dialog history comprising prior responses; and
      generate a dialog context embedding based on the dialog history; and
   a speech generator configured to:
      receive the speaker embedding, the dialog context embedding, and a text input associated with the conversation; and
      generate at least one emotional audio response for the at least one speaker using the speaker embedding, the dialog context embedding, and the text input and without retraining the trained generative AI model.

9. The system of claim 8, wherein the dialog context encoder comprises:
   a pretrained Bidirectional Encoder Representations from Transformers (BERT) model; and
   a trainable adapter module configured to aggregate semantic information from the dialog history into the dialog context embedding.

10. The system of claim 9, wherein the trainable adapter module comprises a multilayer perceptron and a global average pooling operation.

11. The system of claim 8, wherein the speaker encoder, the dialog context encoder, and the speech generator are jointly trained using a rectified flow matching technique.

12. The system of claim 11, wherein the speech generator comprises:
- a diffusion transformer configured to receive noised latents and predict a flow vector conditioned on the speaker embedding and the dialog context embedding;
- an ordinary differential equation solver configured to generate speech latents from the flow vector; and
- a vocoder configured to generate a waveform from the speech latents.

13. The system of claim 12, wherein the vocoder comprises a pretrained Vocos model, and the ordinary differential equation solver is a Euler solver.

14. The system of claim 8, further comprising a module configured to precompute and cache speaker embeddings during inference to reduce latency.

15. The system of claim 8, wherein the speaker encoder includes an EnCodec encoder operating at a sampling rate of 24 kHz, and wherein the system further comprises a pretrained decoder configured to accelerate training and inference.

16. A non-transitory computer-readable medium storing instructions that, when executed by one or more processors, cause the one or more processors to perform a method for generating human speech audio in a conversation using a trained generative AI model, the method comprising:
- receiving a text input representing a portion of the conversation;
- receiving dialog context associated with the conversation;
- receiving information representing at least one voice and speaking style of at least one speaker in the conversation;
- generating the at least one voice and speaking style based on the information; and
- generating at least one emotional audio response for the at least one speaker using the at least one voice and speaking style and without retraining the trained generative AI model, wherein training a generative AI model to obtain the trained generative AI model comprises:
  - pretraining using a dataset comprising transcribed multilingual speech waveforms; and
  - fine-tuning using a dataset comprising high-quality dialog recordings.

\* \* \* \* \*